Feb. 14, 1956     G. O. STRIKER     2,735,062
INSTRUMENTS FOR THE MEASURING OF CERTAIN PROPERTIES
THROUGH IONIZATION CURRENTS
Filed Sept. 27, 1948     2 Sheets-Sheet 1

$$p = K \frac{z_2 E_2'}{Z_2 E_1'}$$

INVENTOR.
George O. Striker
BY
Michael S. Striker

Feb. 14, 1956 G. O. STRIKER 2,735,062
INSTRUMENTS FOR THE MEASURING OF CERTAIN PROPERTIES
THROUGH IONIZATION CURRENTS
Filed Sept. 27, 1948 2 Sheets-Sheet 2
FIG. 4.
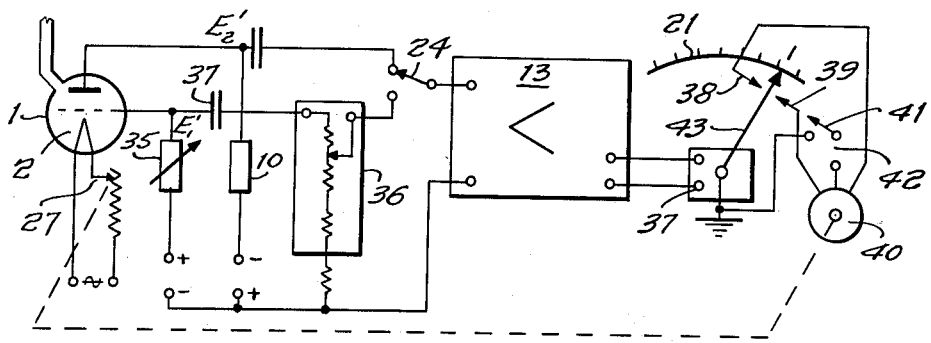
FIG. 5.
FIG. 6.
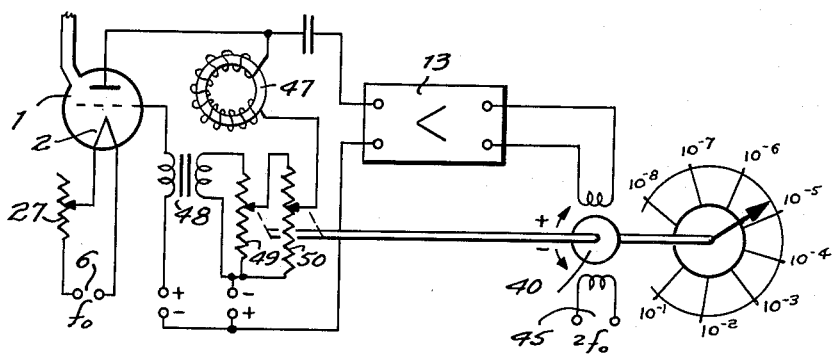
INVENTOR.
George O. Striker
BY
Michael Striker

United States Patent Office 2,735,062
Patented Feb. 14, 1956

2,735,062

INSTRUMENTS FOR THE MEASURING OF CERTAIN PROPERTIES THROUGH IONIZATION CURRENTS

George O. Striker, Chicago, Ill.

Application September 27, 1948, Serial No. 51,422

7 Claims. (Cl. 324—33)

My present invention relates to instruments for the measuring of certain properties through ionization currents.

An object of my present invention is an instrument for the convenient measurement of ionization currents in rarified gases, particularly in the presence of primary electron currents generating the same.

A further object of my invention is use of A. C. amplifiers for making such measurements and the elimination thereby of many undesirable instabilities which ordinarily accompany use of D. C. amplifiers.

It is still a further object of my present invention to use such methods for the convenient measurement of the ratio of such ionization currents to the electron currents by which they are produced.

Another object of my invention is to provide a convenient use of photo-emissive or other cold cathode electron sources for producing ionization currents, thereby eliminating the detrimental effects of hot filaments upon the ionized gases.

Still another object of my invention is to obtain a greater life span for hot cathode vacuum gauge tubes by actuating them at a greatly reduced filament temperature.

It is still another object of this invention to obtain gas pressure readings which are entirely independent from the absolute magnitude of the electron or ion currents in the ionization tube and to obtain a similar independence from supply voltage variations.

It is also an object of the invention to eliminate the effect of conductive leakage currents upon the readings of the ionization gauge instrument.

Finally, it is a further object of my invention to prove three or more decades of pressure readings on a single scale without the necessity of performing range switching.

With the above objects in view, my invention mainly consists in an arrangement for the measurement of ionization currents caused by electron emission in a rarified gas, comprising in a discharge vessel a source of electrons furnishing a periodically varying flow of electrons, an electron collector electrode and an ion collector electrode, and further comprising a load impedance connected between said ion collector electrode and a source of negative potential, a voltage amplifier connected to the load impedance for amplifying alternating voltage components appearing across the load impedance in response to the periodically varying electron flow in the discharge vessel, and means responsive to amplified A. C. voltages connected to the output of the amplifier.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a circuit diagram of an instrument for the measurement of vacuum in rarified gases, including automatic filament control means;

Fig. 5 is a circuit diagram of a vacuum gauge or leak detector enabling the direct measurement of the ratio of ion current to electron current by the use of manual ratio balancing means; and Fig. 6 is a circuit diagram of a vacuum gauge with automatic ion current to electron current ratio balancing arrangement.

Figure 1:
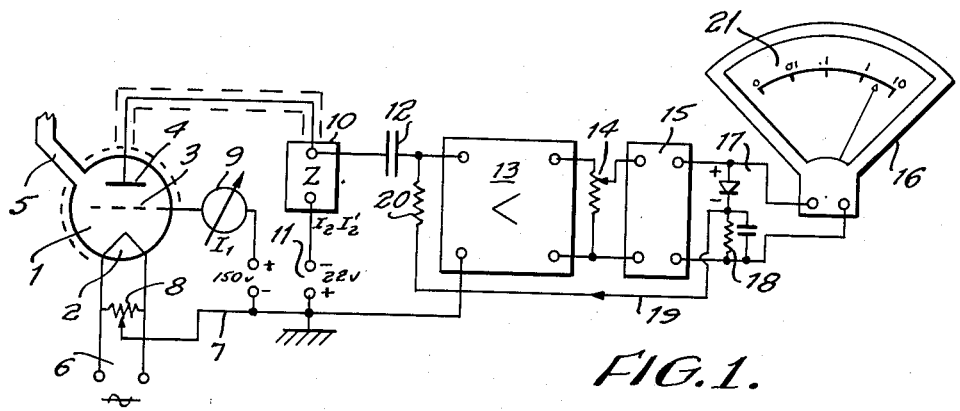
Fig. 1 is a circuit diagram of an instrument for the simultaneous measurement of ionization currents and electron currents, whereby the former are measured with A. C. amplifying means.

As shown in the drawings, the vacuum gauge tube 1, containing an emissive filament 2, an accelerator grid 3 and ion collector electrode 4, is connected to the vacuum system under measurement through tubulation 5. The emissive filament 2 is connected to a source of alternating current 6 so that electrons may be emitted and passed on the accelerator grid 3. This grid 3 is itself connected to a source 7 of 150 volts positive potential with respect to the artificial center of filament 2 at the tap of potentiometer 8. The average electron current $I_1$ flowing in this circuit is measured by use of indicating instrument 9. The electron current flowing to grid 3 ionizes in a known manner some of the gas molecules present in gauge tube 1, and these ionized molecules are then collected by collector electrode 4. The charges of these ionized molecules are returned to the filament 2 through load impedance 10 and potential source 11, said potential source being so connected that it applies approximately 20 volts negative potential to the collector electrode 4.

Due to the fact that the filament 2 is energized by an alternating current, its temperature will vary in time at twice the frequency $f_0$ of A. C. current source 6, thereby also changing periodically its emissive characteristics. The electron stream to accelerator grid 3 will thus be modulated in the rhythm of twice the frequency of the frequency $f_0$ of the current source 6. Consequently, since the ion current in the tube has only an insignificant lag behind the electron current, the ionization current $I_2$ flowing through load impedance 10 will also contain an A. C. component which is proportional to the A. C. component of the electron current collected by accelerator 3. Exhaustive experiments have established the fact that the ratio of the A. C. component to the D. C. average value of $I_1$ is the same as the A. C. to D. C. ratio of the ionization current $I_2$. This fact enables us to measure the A. C. component of the ionization current and to use this measurement for determining the pressure prevailing within vacuum gauge tube 1 with the use of the following data: The electron current $I_1$ indicated on instrument 9, the constant of percentage A. C. modulation $m$ established independently, and the gauge constant $k$ characteristic to the respective electrode structure used in gauge tube 1. This relation can be expressed as follows:

$$P = \frac{K}{m} \cdot \frac{I_2'}{I_1}$$

whereby P is the pressure, K is the gauge constant, $m$ is the modulation percentage, $I_1$ the D. C. component of the electron current, and $I_2'$ the A. C. component of the ion current. By definition $$I_2' = m \cdot I_2$$

$I_2'$ causes an A. C. voltage component to appear across load impedance 10. This A. C. voltage $E_2'$ is connected through condenser 12 to the input of amplifier 13 which is prevented by the condenser 12 from being fed with any D. C. voltage or potential. The amplified A. C. voltage appearing at the output of amplifier 13 is passed on to attenuator 14 and filter 15. This filter is peaked at the frequency $2f_0$, which is the frequency of fluctuation of both the electron current $I_1$ and the ion current $I_2$. The purpose of the filter is to reduce the influence of all undesired stray voltages, thermal agitation, or shot noise voltages which may appear at the input of amplifier 13 simultaneously with signal voltage $E_2'$. The output of filter 15 is applied on one hand to the rectifier type indicating instrument 16 and on the other hand through a rectifying diode 17 to a filter network 18. The condenser of this filter network will charge up to approximately the peak value of the output voltage furnished by filter 15 and this D. C. voltage can be utilized for automatic gain control of amplifier 13 when said voltage is applied to the input grid through AGC path 19 and grid leak resistor 20. The purpose of this automatic gain control is to create in amplifier 13 and approximately logarithmic amplification response, the result of which is shown in the dial 21 of indicating instrument 16. This dial 21 shows four decades of pressure indications condensed into a single scale, thereby eliminating the necessity of range switching when the pressure changes from the one decade range to the next. It is well known that the accuracies required in high vacuum measurement are such that such a scale will furnish readings of sufficient accuracy, whereby the percentage of the reading error will remain constant throughout the scale because of the logarithmic character.

The arrangement shown in Figure 1 enables me to use, instead of a highly fragile and slow-responding D. C. galavanometer or unstable D. C. amplifier, as heretofore employed for the measurement of the faint ion current $I_2$, an inexpensive and stable, fast-responding A. C. amplifier and indicator with certain additional advantages. One of these is the possibility of including attenuator 14 for the purpose of calibrating the amplifier for various gases, having different gas constants K and thus making the indicating instrument 16 direct reading for all these various gases. Clearly, conductive leakage across the envelope will not affect the readings of my instrument. Furthermore, the possibility of employing automatic gain control enables me to condense several decades on scale 21 of the instrument and thereby to eliminate the necessity for range switching between decades. Finally, the indicating instrument 16 can be of such type that a permanent record or a control action can be derived from it since it is provided with considerable actuating power by amplifier 13.

Figure 2:
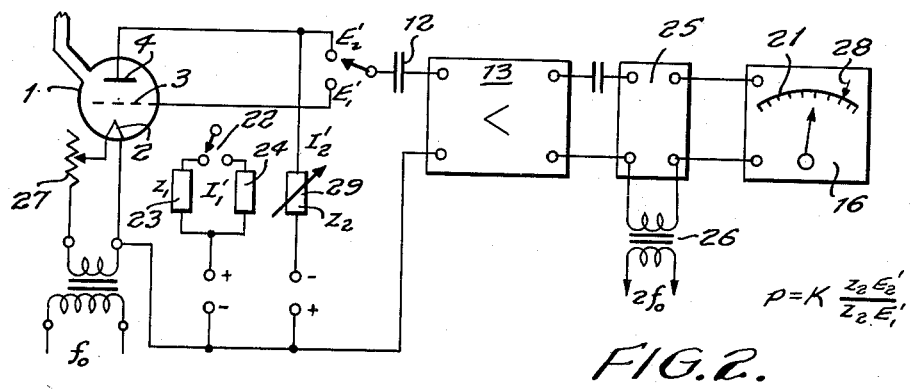
Fig. 2 is a circuit diagram of an instrument for the measurement of ionization and electron currents by the use of the same A. C. amplifying and indicating means.

Another preferred embodiment of the invention is shown in Figure 2. Here, I again employ gauge tube 1 with electrodes 2, 3 and 4 performing the functions described above. In this embodiment, however, the amplifier 13 is used also for the measurement of the electron current $I_1$ in a manner very similar to that used for measuring $I_2$ in the arrangement according to Figure 1. As mentioned above, it was established that the modulation factors of $I_1$ and $I_2$ are identical at these low frequencies and therefore $$I_1' = m \cdot I_1$$

and $$I_2' = m \cdot I_2$$

whereby again $I_1$, $I_2$ are the D. C. components and $I_1'$, $I_2'$ are the corresponding A. C. components of the electron and ion currents. Therefore, the relation holds that $$P = K \times I_2'/I_1'$$

This simplifies the problem to the measurement of the A. C. components of the currents only. A further simplification can be obtained by reducing the measurement to A. C. voltage drops across load impedance employed in the electron and ion current paths. These A. C. voltage drops bear the following relationships:

$$E_1' = I_1' \times Z_1$$

and $$E_2' = I_2' \times Z_2$$

whereby $Z_1$ and $Z_2$ are the impedances of the respective load circuits. Substituting in the previous equations, I obtain $$P = K \frac{Z_2 E_2'}{Z_1 E_1'}$$

If I arbitrarily choose $Z_1/Z_2 = K$, I obtain the relationship $$P = E_2'/E_1'$$

The ratio of the input voltages can thus be directly read on the output instrument 16 which will preferably be calibrated directly in terms of pressure.

The procedure of measurement using the arrangement according to Figure 2 is as follows:

With switch 22 in the position as shown, $E_1'$ will be developed by $I_1'$ across the impedance $Z_1$ of load 23. With switch 24 thrown into the lower position, $E_1'$ will be applied through condenser 12 to the input of amplifier 13 and further to synchronous rectifier 25. Upon application of a synchronizing voltage of frequency $2f_0$ through transformer 26 to synchronized rectifier 25, a D. C. output voltage will be passed on to indicating instrument 16. With the help of rheostat 27 in the filament circuit, the emission of filament 2 is so adjusted that the indication of instrument 16 is brought to the standardizing mark 28, thus establishing a certain electron current to grid 3. If I now throw switch 24 into the upper position as shown in Figure 2, I shall apply $E_2'$ to the amplifier and rectifier system and I may read vacuum pressures on the dial 21 of indicating instrument 16. It is most desirable at pressures above 1 micron to keep the filament temperature as low as possible to avoid damage to the filament. For these higher pressure ranges, switch 22 will be thrown into the right hand position, thus including load 24 in the electron return path. The impedance of load 24 may be made exactly one hundred times impedance $Z_1$ of load 23 and filament current control 27 will have to be readjusted until the A. C. component of the electron current $I_1'$ is decreased to 100th of its previous value, thereby reestablishing the input voltage $E_1'$ and causing again a deflection of the indicating instrument to standardizing mark 28, when switch 24 is in its lower position. Naturally, all pressure readings on dial 21 will now have to be multiplied by 100 to obtain the correct pressure values. The standardization of this embodiment for various gases is obtained through the adjustment of variable load impedance 29, by which the ratio of $Z_2$ to $Z_1$ can always be adjusted to equal gas constant K for the particular gas under measurement.

The special features of this embodiment of my invention will be found in the use of the same A. C. measuring method for determining both the electron and the ion currents, thereby eliminating indicating instrument 9 used in the arrangement shown in Figure 1. Furthermore, by using the sensitive amplifier 13 for measuring the grid current, the latter can be reduced to .1 or even .001 milliampere, thereby assuring an extremely low operating temperature for the emissive filament 2 in the vacuum gauge. This feature will be found advantageous not only in prolonged life for the filament but also in a sharp reduction in thermal dissociation of the gases under measurement and a considerable extension of the useful range of the vacuum gauge into the range of 10 or even 100 microns and up. Furthermore, since all measurements are made on the same instrument, the arrangement will be more compact and easier to manipulate. The synchronous rectifier 25 chosen in this embodiment may of course be replaced by a sharp filter circuit and an extraneous rectifier.

Figure 3:
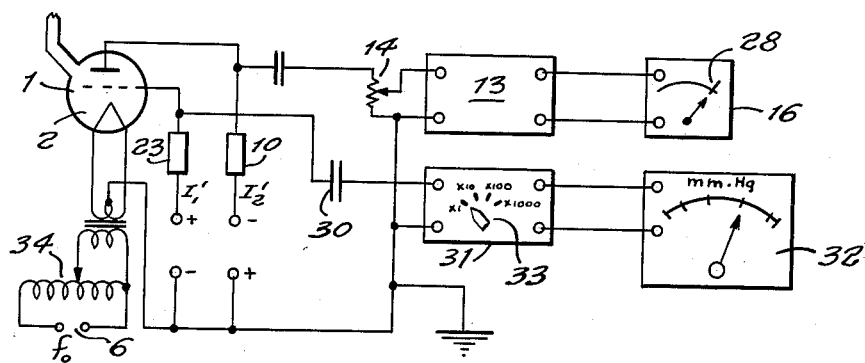
Fig. 3 is a circuit diagram of an instrument for the measurement of the ratio of the ionization current to the electron current, whereby the ionization current is held constant by manual means.

The preferred embodiment of my invention shown in Figure 3 enables me to further reduce the temperature of filament 2 in vacuum gauge 1 to the absolute minimum necessary for the measurement of any particular pressure existing in said tube. In this arrangement, the A. C. voltage drop across load 10 is amplified by amplifier 13 after passing through standardizing attenuator 14. For the sake of simplicity, filter circuits and rectifiers shown in the other embodiments are assumed to be included with amplifier 13. Indicating instrument 16 is provided with a standardizing mark 28, so that voltage drop $E_2'$ can always be adjusted to the same predetermined value by use of variable transformer 29, which supplies filament 2 with A. C. current. In view of the relationships between electron current and ion current established above, the electron current $I_1$ and the corresponding A. C. drop across load 23, $E_1'$ will vary in accordance with the pressure under measurement, if all other conditions are kept constant. This A. C. voltage $E_1'$ is connected through condenser 30 to a second amplifier 31 which can also be tuned to twice the frequency of A. C. supply 6, the output being connected to a second indicating instrument 31.

While in the embodiments shown in Figures 1 and 2 the electron current was held constant and the variable magnitude of the ionization current was measured as a function of varying pressure, the embodiment just described reverses the process and holds the ionization current constant during all measurements. By holding the ion current constant at this very low value determined by the sensitivity of amplifier 13 and indicating instrument 16, I can reduce the grid current to the bare minimum sufficient to produce the necessary ion current through load 10. In this manner, the filament temperature is reduced even further below the values used in previously described arrangements and the advantages obtained thereby are further multiplied. The proper calibration for various gases is obtained in this case through adjustment of attenuator 14, by which the amplification imparted upon voltage $E_2'$ produced across load 10 is set to the proper value. Amplifier 31 may comprise a range switch 33 by which its sensitivity can be varied over wide limits. Naturally, such automatic gain control features as shown in Figure 1 may also be included to give indicator 32 a logarithmic scale arrangement.

A further preferred embodiment of my invention is shown in Figure 4. The A. C. voltage drop produced across loads 10 and 35 in the ion and electron circuits by virtue of the A. C. current passed through filament 2 are again applied to the input of amplifier 13 through switch 24. The input signal from the grid circuit is adjustable by variable load impedance 35 for the purpose of calibration and furthermore for range switching by the step attenuator 36 inserted between condenser 37 and switch 24. In the output of amplifier 13, I provide an instrument 37 which is provided with controlling elements 38 and 39 for the purpose of controlling the action of control motor 40. This motor is mechanically connected to filament rheostat 27. If switch 24 is thrown into its lower position, A. C. signal $E_1'$ is applied to the input of amplifier 13 through step attenuator 36. The output signal from amplifier 13 will deflect instrument 38 and it will actuate one of the two controlling elements 38 or 39 which may either be mechanical contacts or capacitive, inductive or photoelectric control elements. Simultaneously with actuating switch 24, switch 41 is also closed, thus connecting power source 42 into the circuit of reversible motor 40. This will cause motor 40 to rotate rheostat 27 into such a position that the emission of filament 2 is altered until instrument 37 no longer makes contact with the respective controlling element 38 or 39. Should this correction have been exceeded, the instrument 37 will actuate the opposite controlling element and motor 40 will reverse its rotation, resetting rheostat 27 to its proper value. In this manner, upon throwing switch 24 and its coupled element, switch 41, into the lower position, the arrangement just described will automatically establish the proper filament emission necessary for a standard grid current to flow through the grid circuit of vacuum gauge tube 1. By releasing the switches 24 and 41 to their upper position, first of all power source 42 is disconnected from motor 40 and furthermore, amplifier 13 is connected to load impedance 10. The indicating instrument 38 will now indicate pressure values on its scale 21. By virtue of step attenuator 36 I can establish a variety of grid current values covering a wide range and thereby extending the usefulness of this arrangement over wide pressure limits. At all times the grid current may be held at a very low value due to the high amplification available through A. C. amplifier 13. The controlling elements 38 and 39 must of course not impede the movement of pointer 43 of indicating instrument 37, when pressure readings are to be obtained. It is also possible, of course, to use separate instruments for automatic filament current control and for pressure indication. Various well known electronic current control systems can also be applied.

A further improvement of my invention disclosed in Figure 5 makes even better use of the flexibility of A. C. amplifying methods. In this arrangement, the A. C. component of the ion current drop $E_2'$ across the variable ion collector load 29 and the A. C. component of the electron current drop $E_1'$ in the grid load impedance 35 are connected in series through condenser 44 and their sum applied through condenser 12 to the input of the amplifier 13. Since the direction of the momentary currents through these two load impedances is always opposite, the voltage appearing at the input terminals of amplifier 13 will be $E_2'-E_1'$, and if the ratio of impedances 29 and 35 is adjusted so that $I_1' \cdot Z_1$ is equal to $I_2' \cdot Z_2$, these two voltage drops will be equal and the net A. C. signal voltage appearing at the input of the amplifier will become zero. The output of amplifier 13 is coupled to synchronous rectifier 25 which is energized with synchronizing voltage from voltage source 45 having twice the frequency $f_0$ of that of the filament supply source 6. The output of the synchronized rectifier 25 is connected to instrument 46, consisting essentially of a balance indicator similar to those used in bridge or compensating circuits.

With variable plate load 29 adjusted to the proper calibration for the gas under measurement, variable grid load 35 can be adjusted to a point where the output instrument 46 will indicate zero on balance. At this point $E_1'=E_2'$ and the ratio of the value of impedances 29 and 35 directly indicates the ratio of the respective currents. Inasmuch as an ionization gauge is fundamentally based on the measurement of the ratio of ion current to grid current, this improvement of my invention furnishes information of great value to the practice of vacuum measurement. The greatest advantage of this preferred embodiment consists in that any variation in filament currents will leave unaffected the balance position of rheostat 35, so that it becomes unnecessary to constantly check and readjust the emission of the vacuum gauge filament 2. It will be seen that amplifier 13 as well as rectifier 25 and indicator 46 serve only as bridge balance amplifiers and indicators and that therefore their gain characteristics need not be held to close tolerances. Rheostat 27 is provided only to establish an operating point for the filament consistent with long life and low gas dissociation. The resistance versus rotation curve of rheostat 35 may advantageously be so shaped that a uniform logarithmic scale of the nature indicated in Figure 5 is obtained. Clearly the instrument 46 may be equipped with control elements similar to those indicated in Figure 4 for the purpose of actuating an alarm on a control mechanism whenever the balance of ion and grid currents is seriously disturbed by changes in vacuum pressure. Furthermore, the scale of instrument 46 may be calibrated to indicate the magnitude by which the actual pressure deviates from that to which rheostat 35 has been previously adjusted. A further feature of this arrangement consists in that it will indicate sudden deviations from balance only in response to pressure change or in response to the sudden changes in the nature of gas admitted to the system. This is of great value in the determination of leaks by the use of acetone or the like.

A more automatic system of vacuum measurement, incorporating the features shown in Figure 5, will be seen by inspection of Figure 6. In this preferred embodiment, I show the use of a toroidal inductance 47 to serve as plate load impedance, while using transformer 48 as a grid load impedance, which at the same time serves to isolate the respective D. C. components. In place of the single rheostat 35, two tapered potentiometers 49 and 50 are used across the secondary of transformer 48, thereby obtaining a larger range of control than would be obtainable otherwise. With this arrangement, voltage obtained by the series connection of the output of potentiometer 50 and inductance 47 is applied to amplifier 13, whose output is connected to one winding of a reversible motor 40. The other winding is again connected to a current source 45 of twice the frequency of current source 6 and so phased with respect to this current source that it will furnish maximum torque upon the appearance of an output signal at the output terminals of amplifier 13. This reversible motor has its shaft connected to the rotor arms of potentiometers 49 and 50, on the one hand, and to a pointer and dial arrangement 51, on the other hand. Whenever, due to change of vacuum in gauge tube 1, or for other reasons, an unbalance voltage appears at the input of amplifier 13, the motor 40 will become energized and will rotate the potentiometer arms in the direction of decreasing unbalance until balance is reestablished. Should this point have been exceeded, the motor will be reversed by the new unbalance voltage and seek the angle of zero unbalance signal. As is shown on the dial of instrument 51, for any particular gas, each angle of rotation of potentiometers 49 and 50 is correlated with an angle on the circular scale of this instrument, and by appropriate taper applied to these potentiometers a logarithmic gauge dial may be obtained reading, for instance, from $10^{-1}$ to $10^{-8}$ mm. mercury. Such a device will furnish considerable power for the actuating of recording or controlling mechanisms or for the moving of large industrial panel indicating instruments of known types. Rheostat 27 may in known fashion be connected with the shaft of motor 40 so that the emission of filament 2 is reduced in the area of pressures above $10^{-3}$ mm. mercury. Obviously, a shut-off mechanism to disconnect the filament whenever pressure rises above a given value, can easily be incorporated in an arrangement such as the one shown in Figure 6.

While I have disclosed in the above detailed description of certain embodiments of my invention the manner in which the A. C. amplifying methods can be applied to hot cathode or filament type electron discharge devices, my invention is not restricted to the use of such cathode materials. In certain cases I have found it most advantageous to eliminate hot flowing filaments from the electron discharge space and to use cold cathode surfaces for generating the electron current necessary to ionize the rarified gas.

One such cold cathode surface used advantageously in connection with the A. C. amplifying means will be found in a photo-emissive surface, such as pure platinum or tantalum, which, upon irradiation of visible or ultraviolet light of periodically varying intensity will emit a stream of electrons which in itself will also periodically vary in amplitude. The above materials are given as preferable for the reason that they are chemically most stable and will not interact with gases present in their vicinity.

While the preferred embodiments as described above utilize the variation of the photo-emissive condition of the cathode proper for the purpose of varying the electron screen and consequently also the ion current, it will sometimes be found advantageous to include a separate control electrode into the space between cathode and electron accelerator electrode for the purpose of varying the intensity of the electron screen. In this case, of course, particular care must be taken to exclude capacitive or conductive stray currents from reaching the ion collector electrode, so that the current variations appearing at the latter electrode represent only those caused from the periodic variation of ion current.

As has been shown in the above description, my invention for the measurement of ionization currents can be used for measuring the pressure of rarified gas in a wide range of vacua. It is, however, understood that it is similarly useful in the measurement of variations in the nature of the gas present in the discharge vessel, even when the pressure itself remains constant or only slightly variable. This use enables the construction of a most desirable leak detector based on the application of acetone or other highly ionizable compounds to the exterior of a vacuum system. Furthermore, it is also most useful in the chemical analysis of gases in a rarified atmosphere.

What is claimed is:

1. An arrangement for the measurement of ionization currents caused by electron emission in a rarified gas, comprising in a discharge vessel a hot-filament cathode energized by alternating current and furnishing an electron flow periodically varying at twice the frequency of said alternating current; an electron collector electrode; an ion collector electrode; and further comprising a load impedance connected between said ion-collector electrode and a source of negative potential with respect to said emissive filament; a voltage amplifier having an input connected to said load impedance; means for preventing any D. C. potential from being fed to said input of said amplifier so that the latter amplifies only alternating potentials generated across said load impedance by periodical fluctuations of ion currents in response to the periodical variations in emission of said hot-filament cathode; and means responsive to the amplified alternating voltages connected to the output of said amplifier.

2. An arrangement for the measurement of ionization currents caused by electron emission in a discharge vessel having a filamentary cathode heated by alternating current and furnishing an electron flow periodically varying at twice the frequency of said alternating current; an electron collector electrode; and an ion collector electrode; comprising a load impedance connected between the ion collector electrode and a source of negative potential; a voltage amplifier having an input connected to said load impedance; means for preventing any D. C. potential from being fed to said input of said amplifier so that the latter amplifies only alternating voltage components appearing across said load impedance in response to the periodically varying electron flow in the discharge vessel, said amplifier having a frequency response sharply restricted to twice the frequency of said alternating current, thereby excluding undesired noise or stray voltages from the output of said amplifier; and means responsive to amplified A. C. voltages connected to the output of said amplifier.

3. An arrangement for the measurement of ionization currents caused by electron emission in a rarified gas, comprising in a discharge vessel a filamentary cathode heated by alternating current and furnishing an electron flow periodically varying at twice the frequency of said alternating current; an electron collector electrode; an ion collector electrode; and further comprising a load impedance connected between said ion collector electrode and a source of negative potential; a voltage amplifier connected to said load impedance for amplifying alternating voltage components appearing across said load impedance in response to said periodically varying electron flow in said discharge vessel; a synchronous rectifier connected to the output of said amplifier and so operated that it will rectify primarily at twice the frequency of the heating current of said filamentary cathode; and means responsive to the output of said synchronous rectifier.

4. An arrangement for determining the magnitude ratio of ionization currents to the electron currents in rarified gas, comprising in combination a discharge vessel containing a filamentary cathode heated by alternating current and furnishing an electron flow periodically varying at twice the frequency of said alternating current; an electron collector electrode and an ion collector electrode; and further comprising an ion collector load impedance connected between said ion collector and a voltage source negative with respect to said electron source; an electron collector load impedance connected between said electron collector electrode and a voltage source positive with respect to said electron source, one of said load impedances being arbitrarily adjustable to provide calibration adjustment and range multiplication; an amplifier having high amplification at twice the frequency of said alternating current heating said filamentary cathode; means for connecting said amplifier alternately to said ion collector load impedance and to said electron collector load impedance; and indicating means connected to the output of said amplifier for determining the amplified alternating voltages arising across said load impedances in response to said periodically varying electron flow.

5. An arrangement for determining the magnitude ratio of ionization currents to the electron currents in rarified gas, comprising in combination a discharge vessel containing a filamentary cathode heated by alternating current and furnishing an electron flow periodically varying at twice the frequency of said alternating current; an electron collector electrode and an ion collector electrode; and further comprising an ion collector load impedance connected between said ion collector and a voltage source negative with respect to said electron source; an electron collector load impedance connected between said electron collector electrode and a voltage source positive with respect to said electron source, the alternating potentials arising across said two load impedances being applied in series to an amplifier responsive to twice the frequency of said alternating current, heating said filamentary cathode; and indicating means connected to the output of said amplifier for indicating the presence of a net resultant voltage at the input of said amplifier, one or both of said load impedances being arbitrarily adjustable for purposes of calibration and the restoration of equality between said two alternating potentials connected in series, whereby the ratio of said two load impedances at said point of equality is inversely proportional to said ratio of ionization current to electron current.

6. An arrangement for determining the magnitude ratio of ionization currents to the electron currents in rarified gas, comprising in combination a discharge vessel containing a filamentary cathode heated by alternating current and furnishing an electron flow periodically varying at twice the frequency of said alternating current; an electron collector electrode and an ion collector electrode; and further comprising an ion collector load impedance connected between said ion collector and a voltage source negative with respect to said electron source; an electron collector load impedance connected between said electron collector electrode and a voltage source positive with respect to said electron source, the alternating potentials arising across said two load impedances being applied in series to an amplifier responsive to twice the frequency of said alternating current, heating said filamentary cathode; synchronous rectifying means connected to the output of said amplifier; a polarized indicating means connected to said synchronous rectifying means for indicating the polarity of the off-balance signal, said electron collector load impedance being arbitrarily adjustable and provided with a scale calibrated in values proportional to said ratio of ionization current to electron current, and said ion collector load impedance being arbitrarily adjustable to provide calibration adjustment for various gases or discharge vessel structures.

7. An arrangement for determining the magnitude ratio of ionization currents to the electron currents in rarified gas, comprising in combination a discharge vessel containing a filamentary cathode heated by alternating current and furnishing an electron flow periodically varying at twice the frequency of said alternating current; an electron collector electrode and an ion collector electrode; and further comprising an ion collector load impedance connected between said ion collector and a voltage source negative with respect to said electron source; an electron collector load impedance connected between said electron collector electrode and a voltage source positive with respect to said electron source, the alternating potentials arising across said two load impedances being applied in series to an amplifier responsive to twice the frequency of said alternating current, heating said filamentary cathode; reversible movable electro-mechanical moving means connected to the output of said amplifier, synchronized from a source of a frequency equal to that of said periodically varying electron flow; and attenuating means for arbitrarily varying the magnitude of said alternating potential arising across said electron collector load impedance, said electro-mechanical moving means being coupled to said attenuating means so as to continuously adjust same to the position where no net unbalance signal reaches the input of said amplifier, said electro-mechanical moving means being further coupled to indicating means calibrated in values proportional to said ratio between ionization current and electron current prevailing in said discharge vessel.

References Cited in the file of this patent

UNITED STATES PATENTS

| | | |
|---|---|---|
| 1,592,364 | Houskeeper | July 13, 1926 |
| 2,334,356 | Salzberg et al. | Nov. 16, 1943 |
| 2,442,518 | Stratton | June 1, 1948 |
| 2,454,564 | Nelson | Nov. 23, 1948 |
| 2,504,772 | White | Apr. 18, 1950 |
| 2,510,691 | Gilbert | June 6, 1950 |
| 2,560,952 | Herold | July 17, 1951 |
| 2,576,330 | Beringer | Nov. 27, 1951 |